United States Patent
Chaudhuri et al.

(10) Patent No.: US 6,278,989 B1
(45) Date of Patent: Aug. 21, 2001

(54) HISTOGRAM CONSTRUCTION USING ADAPTIVE RANDOM SAMPLING WITH CROSS-VALIDATION FOR DATABASE SYSTEMS

(75) Inventors: Surajit Chaudhuri, Redmond, WA (US); Rajeev Motwani, Palo Alto, CA (US); Vivek Narasayya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/139,835

(22) Filed: Aug. 25, 1998

(51) Int. Cl.$^7$ ............................. G06F 17/30; G06E 1/00
(52) U.S. Cl. ................... 707/2; 707/3; 707/101; 706/19
(58) Field of Search .................. 707/2, 3, 101; 706/19

(56) References Cited

U.S. PATENT DOCUMENTS

| | | | |
|---|---|---|---|
| 5,689,696 | * 11/1997 | Gibbons et al. | 707/1 |
| 5,870,752 | * 2/1999 | Gibbons et al. | 707/102 |
| 5,960,435 | * 9/1999 | Rathmann et al. | 707/101 |
| 5,974,536 | * 10/1999 | Richardson | 712/215 |
| 6,052,689 | * 4/2000 | Muthukrishnan et al. | 707/101 |

OTHER PUBLICATIONS

Chaudhuri, Surajit, et al., "An Efficient, Cost–Driven Index Selection Tool for Microsoft SQL Server," Proceedings of the 23rd International Conference on Very Large Data Bases (VLDB), Athens, Greece, pp. 146–155 (Aug. 25–29, 1997).

Chaudhuri, Surajit, et al., "AutoAdmin 'What–if' Index Analysis Utility," Proceedings of ACM SIGMOD, Seattle, Washington, pp. 367–378 (Jun. 1–4, 1998).

Chaudhuri, Surajit, et al., "Random Sampling for Histogram Construction: How Much is Enough?" Proceedings of ACM SIGMOD, Seattle, Washington, pp. 436–447 (Jun. 1–4, 1998).

Finkelstein, S., et al., "Physical Database Design for Relational Databases," *ACM Transactions on Database Systems* (*TODS*), vol. 13, No. 1, pp. 91–128 (Mar. 1988).

(List continued on next page.)

*Primary Examiner*—Thomas Black
*Assistant Examiner*—Frantz Coby
(74) *Attorney, Agent, or Firm*—Watts, Hoffmann, Fisher & Heinke, Co., L.P.A.

(57) ABSTRACT

Using adaptive random sampling with cross-validation helps determine when enough data of a database has been sampled to construct histograms on one or more columns of one or more tables of the database within a desired or predetermined degree of accuracy. An adaptive random sampling histogram construction tool constructs an approximate equi-height k-histogram using an initial sample of data values from the database and iteratively updates the histogram using an additional sample of data values from the database until the histogram is within the desired degree of accuracy. The accuracy of the histogram is cross-validated against the additional sample at each iteration, and the additional sample is used to update the histogram to help improve its accuracy. The accuracy of the histogram may be measured by an error in distribution of the additional sample over the histogram as compared to a threshold error using a suitable error metric. By attempting to sample only the number of data values necessary to construct the histogram within the desired degree of accuracy, the adaptive random sampling histogram construction tool attempts to avoid any cost increases in time and memory from sampling too many data values.

42 Claims, 3 Drawing Sheets

OTHER PUBLICATIONS

Gibbons, Phillip B., et al., "Fast Incremental Maintenance of Approximate Histograms," Proceedings of the 23rd International Conference on Very Large Data Bases (VLDB), Athens, Greece, pp. 466–475 (Aug. 25–29, 1997).

Haas, Peter J., et al., "Sampling–Based Estimation of the Number of Distinct Values of an Attribute," Proceedings of the 21st International Conference on Very Large Data Bases (VLDB), Zurich, Switzerland, pp. 311–322 (1995).

Haas, Peter J., et al., "Sequential Sampling Procedures for Query Size Estimation," Proceedings of ACM SIGMOD International Conference on Management of Data, San Diego, California, pp. 341–350 (Jun. 2–5, 1992).

Hou, Wen–Chi, et al., "Statistical Estimators for Relational Algebra Expressions," Proceedings of the 7th ACM Symposium on Principles of Database Systems, pp. 276–287 (1988).

Hou, Wen–Chi, et al., "Processing Aggregate Relational Queries with Hard Time Constraints," Proceedings of the ACM SIGMOD International Conference on Management of Data, Portland, Oregon, pp. 68–77 (1989).

Hou, Wen–Chi, et al., "Error–Constrained COUNT Query Evaluation in Relational Databases," Proceedings of the ACM SIGMOD International Conference on Management of Data, Denver, Colorado, pp. 278–287 (May 29–31, 1991).

Ioannidis, Yannis, et al., "Histogram–Based Solutions to Diverse Database Estimation Problems," *IEEE Data Engineering Bulletin*, vol. 18, pp. 10–18, (1995).

Ioannidis, Yannis E., et al., "Balancing Histogram Optimality and Practicality for Query Result Size Estimation," Proceedings of the ACM SIGMOD International Conference on Management of Data, San Jose, California, pp. 233–244 (May 23–25, 1995).

Ling, Yibei, et al., "An Evaluation of Sampling–Based Size Estimation Methods for Selections in Database Systems," Proceedings of the Eleventh IEEE International Conference on Data Engineering, Taipei, Taiwan, pp. 532–539 (Mar. 6–10, 1995).

Lipton, Richard J., et al., "Query Size Estimation by Adaptive Sampling," Proceedings of the Ninth ACM SIGACT–SIGMOD–SIGART Symposium on Principles of Database Systems, Nashville, Tennessee, pp. 40–46 (Apr. 2–4, 1990).

Lipton, Richard J., et al., "Practical Selectivity Estimation through Adaptive Sampling," Proceedings of the ACM SIGMOD International Conference on Management of Data, Atlantic City, New Jersey, pp. 1–11 (May 23–25, 1990).

Lipton, Richard J., et al., "Efficient Sampling Strategies for Relational Database Operations," *Theoretical Computer Science*, vol. 116, Elsevier Science Publishers, pp. 195–226 (1993).

Motwani, Rajeev, et al., *Randomized Algorithms*, Cambridge University Press, pp. v–viii (1995).

Naughton, Jeffrey F., et al., "On Estimating the Size of Projections," Proceedings of the Third International Conference on Database Theory (ICDT), Paris, France, pp. 499–513 (Dec. 12–14, 1990).

Olken, Frank, et al., "Simple Random Sampling from Relational Databases," Proceedings of the Twelfth International Conference on Very Large Data Bases (VLDB), Kyoto, pp. 160–169 (Aug. 1986).

Olken, Frank, "Random Sampling from Databases," PhD Dissertation, University of California at Berkeley, Abstract, pp. iii–xii and 1–158 (1993).

Olken, Frank, et al., "Random Sampling from Databases—A Survey," Information and Computing Science Div., Lawrence Berkeley Laboratory, Berkeley, California, pp. 1–55 (Mar. 1994).

Ozsoyoglu, G., et al., "On Estimating Count, Sum, and Average Relational Algebra Queries," Proceedings of the International Conference on Database and Expert Systems Applications, Berlin, Federal Republic of Germany, pp. 406–412 (1991).

Piatetsky–Shapiro, Gregory, et al., "Accurate Estimation of the Number of Tuples Satisfying a Condition," Proceedings of the ACM SIGMOD International Conference on Management of Data, pp. 256–276 (1984).

Poosala, Viswanath, et al., "Improved Histograms for Selectivity Estimation of Range Predicates," Proceedings of the ACM SIGMOD International Conference on Management of Data, Montréal, Québec, Canada, pp. 294–305 (Jun. 4–6,1996).

Selinger, P. Griffiths, et al., "Access Path Selection in a Relational Database Management System," *Readings in Database Systems*, pp. 82–93 (1979).

Zipf, George Kingsley, *Human Behavior and the Principle of Least Effort*, Addison–Wesley Press, Inc., p. xi(1949).

Kooi, Robert P., *The Optimization of Queries in Relational Databases*, Ph.D. Thesis, Case Western Reserve University, pp. i–viii & 1–159 (Sep. 1980).

Manku, Gurmeet S., et al., "Approximate Medians and other Quantiles in One Pass and with Limited Memory" Proceedings of the 1998 ACM SIGMOD International Conference on Management of Data, Seattle, Washington, pp. 426–435 (Jun. 1–4, 1998).

Matias, Yossi, et al., "Wavelet–Based Histograms for Selectivity Estimation", Proceedings of the 1998 ACM SIGMOD International Conference on Management of Data, Seattle, Washington, pp. 448–459 (Jun. 1–4, 1998).

Poosala, Viswanath, Histogram–Based Estimation Techniques in Database Systems, Ph.D. Thesis, University of Wisconsin–Madison, pp. i–xi & 1–143 (1997).

* cited by examiner

HISTOGRAM CONSTRUCTION USING ADAPTIVE RANDOM SAMPLING WITH CROSS-VALIDATION FOR DATABASE SYSTEMS

TECHNICAL FIELD

The present invention relates generally to the field of database systems. More particularly, the present invention relates to the field of histogram construction for database systems.

BACKGROUND OF THE INVENTION

Computer database systems manage the storage and retrieval of data in a database. A database comprises a set of tables of data along with information about relations between the tables. Tables represent relations over the data. Each table comprises a set of records of data stored in one or more data fields. The records of a table are also referred to as rows, and the data fields of records in a table are also referred to as columns.

A database server processes data manipulation statements or queries, for example, to retrieve, insert, delete, and update data in a database. Queries are defined by a query language supported by the database system. To enhance performance in processing queries, database servers use indexes to help access data in a database more efficiently. Typical database servers comprise a query optimizer to generate efficient execution plans for queries with respect to a set of indexes. Query optimizers generate execution plans based on histograms and other statistical information on the column(s) of the table(s) referenced in the queries. Query optimizers typically rely on histograms on selected columns to estimate selectivities of queries.

Database servers typically create histograms on the columns of tables over which indexes are constructed. Database servers may also create histograms on columns that do not have indexes to enhance the accuracy of estimates by query optimizers. Creating histograms, however, can incur significant costs in time and memory, particularly for large databases. Although data values of selected columns may be sampled, for example, to generate approximate histograms, the accuracy of such histograms depends on the size of the sample. Sampling too little data limits the ability of query optimizers to generate relatively accurate execution plans while sampling too much data consumes more time and memory.

SUMMARY OF THE INVENTION

Using adaptive random sampling with cross-validation helps determine when enough data of a database has been sampled to construct histograms on one or more columns of one or more tables of the database within a desired or predetermined degree of accuracy.

In accordance with the present invention, a method may be used for constructing a histogram in a database system comprising a database. The method may be implemented in the form of program modules or computer-executable instructions stored on a computer readable medium.

For the method, a histogram is created using an initial sample of data values from the database. The histogram is updated using an additional sample of data values from the database until the histogram is within a predetermined degree of accuracy. The updated histogram may be used to obtain a query optimization estimate.

The histogram may be defined such that the histogram comprises a predetermined number of bins for storing data values, and a predetermined number of data values may be designated for storage in each bin. The predetermined number of data values designated for all but one of the predetermined number of bins may be the same.

In updating the histogram, an error amount for each of a plurality of bins of the histogram may be determined, and the histogram may be determined to be within the predetermined degree of accuracy if the error amount for each bin is less than or equal to a predetermined threshold.

The additional sample of data values may be partitioned over the histogram. The data values of the additional sample may be partitioned into a plurality of bins in accordance with the histogram. An error in distribution of the additional sample of data values over the histogram may be determined. The difference in the number of data values of the additional sample in each bin from a predetermined number of data values designated for the bin may be determined, and the error in distribution based on the determined differences may be determined. The predetermined number of data values designated for each bin may be approximately equal to the total number of data values of the additional sample divided by the number of bins. The error in distribution may be determined as the maximum of the determined differences or as the maximum fractional difference between the number of data values of the additional sample in any bin as compared to the predetermined number of data values designated for that bin. The histogram may be updated using the additional sample of data values. The histogram may be repeatedly updated in this manner until the error in distribution of the additional sample of data values over the histogram is less than or equal to a predetermined threshold indicating the histogram is within the predetermined degree of accuracy.

A plurality of distinct ranges defined by a sequence of distinct data value separators of the histogram may be determined, and the data values of the additional sample may be partitioned into the plurality of distinct ranges. The error in distribution may be determined based on the partitioning of the data values of the additional sample into the plurality of distinct ranges. The error in distribution may be determined as the maximum fractional difference between the fraction of data values of the additional sample in any distinct range as compared to the fraction of data values of all prior samples in that distinct range.

The initial sample may be a random sample of data values from one relation of data of the database approximately linearly proportional in number to the square root of the total number of data tuples from the one relation of data of the database. The initial sample may also be a random sample of data values approximately linearly proportional in number to the number of bins of the histogram. The initial sample may also be a random sample of data values approximately inversely proportional in number to the square of the predetermined threshold. Each $i^{th}$ additional sample may be a random sample of data values approximately $2^{i-1}$ time(s) the number of data values in the initial sample. The initial sample of data values and each additional sample of data values may be in units of disk blocks each having a predetermined number of data values.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

The subject matter of this patent application is disclosed in a conference paper, Surajit Chaudhuri, Rajeev Motwani, Vivek Narasayya, "Random Sampling for Histogram Construction: How Much is Enough?" *Proceedings of ACM SIGMOD*, Seattle, Wash. pp. 436–447 (Jun. 1–4, 1998). This paper is herein incorporated by reference.

Using adaptive random sampling with cross-validation helps determine when enough data of a database has been sampled to construct histograms on one or more columns of one or more tables of the database within a desired or predetermined degree of accuracy.

Exemplary Operating Environment

Figure 1:
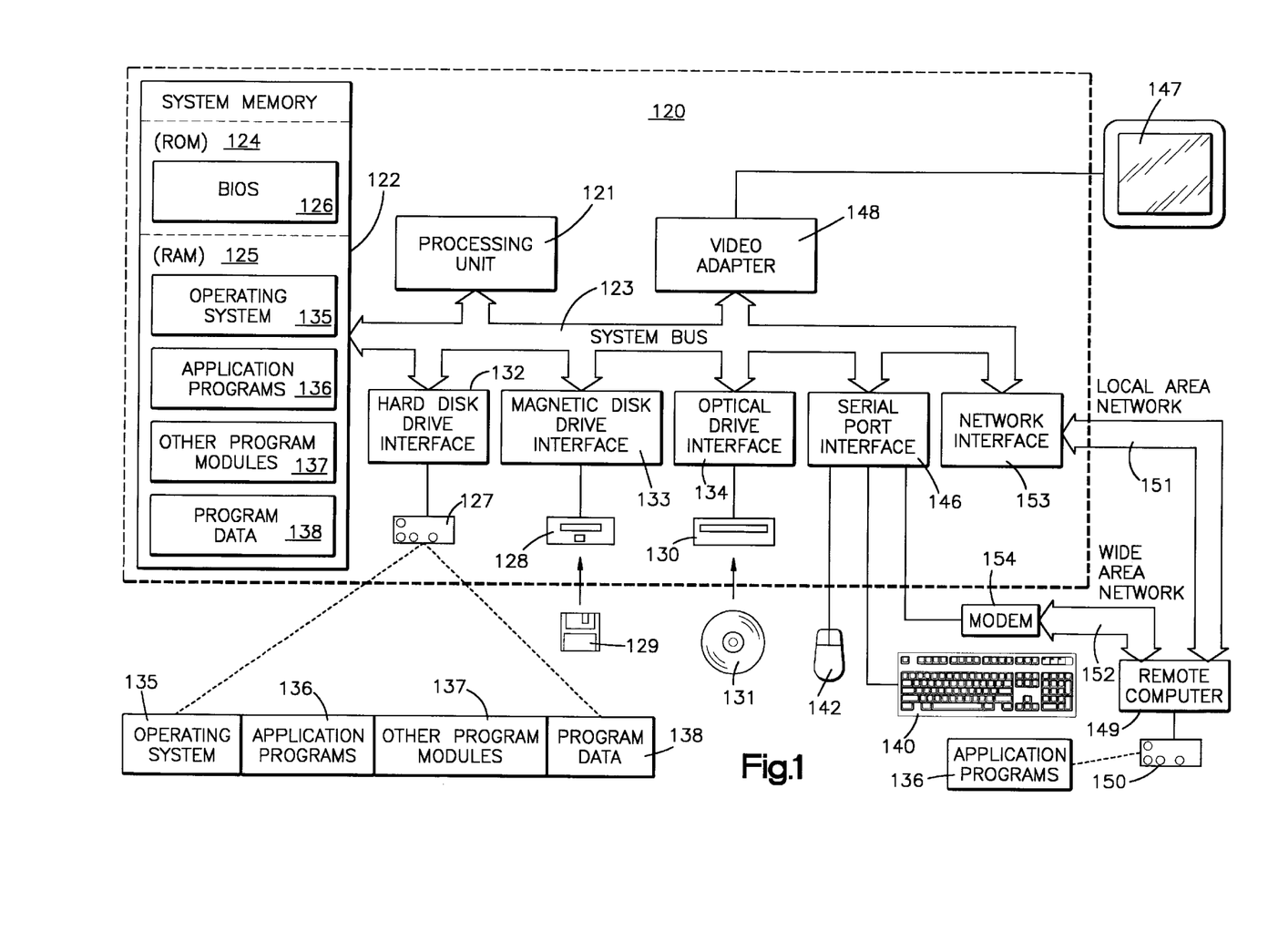
FIG. 1 illustrates an exemplary operating environment for constructing histograms using adaptive random sampling with cross-validation for a database system.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices, such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, personal computer 120 is connected to local network 151 through a network interface or adapter 153. When used in a WAN networking environment, personal computer 120 typically includes a modem 154 or other means for establishing communications over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Database System

Figure 2:
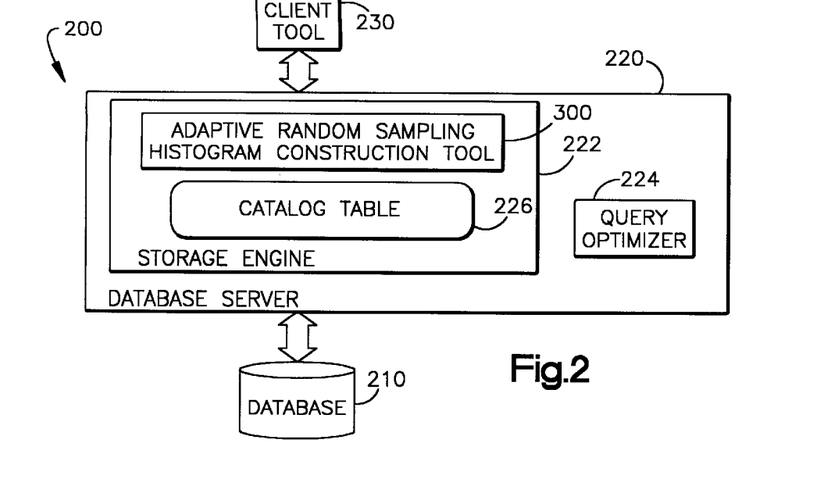
FIG. 2 illustrates, for one embodiment, a database system comprising a tool for constructing histograms using adaptive random sampling with cross-validation.

FIG. 2 illustrates for one embodiment a computer database system 200 comprising a database 210, a database server 220, and a client tool 230. Database system 200 manages the storage and retrieval of data in database 210 in accordance with data manipulation statements or queries presented to database system 200 by a database application or by a user, for example.

Database 210 comprises a set of tables of data. Each table comprises a set of records of data stored in one or more data fields. The records of a table are also referred to as rows, and the data fields of records in a table are also referred to as columns.

Database server 220 processes queries, for example, to retrieve, insert, delete, and/or update data in database 210. Database system 200 may support any suitable query language, such as Structured Query Language (SQL) for example, to define the queries that may be processed by database server 220. Suitable SQL queries include, for example, Select, Insert, Delete, and Update statements. Database server 220 for one embodiment comprises the Microsoft® SQL Server.

Database server 220 comprises a storage engine 222 for accessing data in database 210. To enhance performance in processing queries, database server 220 uses indexes to help access data in database 210 more efficiently. An index may be single-column or multi-column and may be clustered or non-clustered. Database server 220 comprises a query optimizer 224 to generate efficient execution plans for queries with respect to a set of indexes. In generating execution plans, query optimizer 224 uses histograms on the column(s) of the table(s) referenced in a query to estimate, for example, the cost to execute the query against database 210. Query optimizer 224 relies on histograms on selected columns to estimate selectivities of queries.

Database server 220 constructs histograms on the columns of tables over which indexes are constructed during the index generation phase and stores this statistical information in a catalog table 226. Database server 220 may also construct histograms on columns that do not have indexes, for example, to improve the accuracy of query cost estimations by query optimizer 224. Database server 220 may also store such statistical information in catalog table 226.

Database server 220 for one embodiment may construct histograms on columns that do not have indexes to create hypothetical or what-if indexes on those columns. What-if indexes may be used by client tool 230 in any suitable manner.

Client tool 230 may be, for example, an index selection tool as described in U.S. patent application Ser. No. 08/912,036, filed Aug. 15, 1997, and now U.S. Pat. No. 5,950,186 entitled DATABASE SYSTEM INDEX SELECTION USING COST EVALUATION OF A WORKLOAD FOR MULTIPLE CANDIDATE INDEX CONFIGURATIONS, by Surajit Chaudhuri and Vivek Narasayya; in U.S. patent application Ser. No. 08/980,830, filed Dec. 1, 1997, and now U.S. Pat. No. 5,960,423 entitled DATABASE SYSTEM INDEX SELECTION USING CANDIDATE INDEX SELECTION FOR A WORKLOAD, by Surajit Chaudhuri and Vivek Narasayya; in U.S. patent application Ser. No. 08/982,046, filed Dec. 1, 1997, and now U.S. Pat. No. 5,913,207 entitled DATABASE SYSTEM INDEX SELECTION USING INDEX CONFIGURATION ENUMERATION FOR A WORKLOAD, by Surajit Chaudhuri and Vivek Narasayya; in U.S. patent application Ser. No. 08/980,831, and now U.S. Pat. No. 5,913,206 filed Dec. 1, 1997, entitled DATABASE SYSTEM MULTI-COLUMN INDEX SELECTION FOR A WORKLOAD, by Surajit Chaudhuri and Vivek Narasayya; in U.S. patent application Ser. No. 08/980,829, filed Dec. 1, 1997, and now U.S. Pat. No. 5,906,813 entitled DATABASE SYSTEM INDEX SELECTION USING COST EVALUATION OF A WORKLOAD FOR MULTIPLE CANDIDATE INDEX CONFIGURATIONS, by Surajit Chaudhuri and Vivek Narasayya; and in the conference paper, Surajit Chaudhuri and Vivek Narasayya, "An Efficient, Cost-Driven Index Selection Tool for Microsofto SQL Server," *Proceedings of the 23rd International Conference on Very Large DataBases* (*VLDB*), Athens, Greece, pp. 146–155 (Aug. 25–29, 1997). These patent applications and this conference paper are each herein incorporated by reference.

As another example, client tool 230 may also be a hypothetical configuration analysis engine as described in U.S. patent application Ser. No. 09/139,843 filed on the same date as this patent application, entitled WHAT-IF INDEX ANALYSIS UTILITY FOR DATABASE SYSTEMS, by Surajit Chaudhuri and Vivek Narasayya. This patent application is herein incorporated by reference.

Database server 220 comprises an adaptive random sampling histogram construction tool 300 for constructing an approximate histogram over one or more selected colunms of a table of database 210 by randomly sampling a suitable number of data values of the selected column(s) so as to construct the histogram within a desired or predetermined degree of accuracy. By attempting to sample only the number of data values necessary to construct the histogram within the desired degree of accuracy, adaptive random sampling histogram construction tool 300 attempts to avoid any cost increases in time and memory from sampling too many data values. Database server 220 for one embodiment invokes adaptive random sampling histogram construction tool 300 in response to a suitable create or update statistics command issued by client tool 230, for example.

Database server 220, storage engine 222, query optimizer 224, client tool 230, and adaptive random sampling histogram construction tool 300 for one embodiment are implemented as program modules or computer-executable instructions and may be stored on any suitable computer-readable medium for execution in a suitable operating environment, such as the computing environment of FIG. 1 for example. The data of database 210 and catalog table 226 may be implemented in the form of one or more suitable data structures and may also be stored on any suitable computer-readable medium.

Histograms

Adaptive random sampling histogram construction tool 300 for one embodiment constructs approximate equi-height or equi-depth histogram structures as such histogram structures are commonly used by many commercial query optimizers, such as that in the Microsoft® SQL Server for example.

Given a relation with n tuples containing an attribute X defined over a domain D which is assumed to be totally ordered, the value set $V=\{v_1, v_2, \ldots, v_n\}$ denotes the set of values for the attribute X in the n tuples. That is, $v_i \in D$ is the value of X in the ith tuple of the relation.

Figure 3:
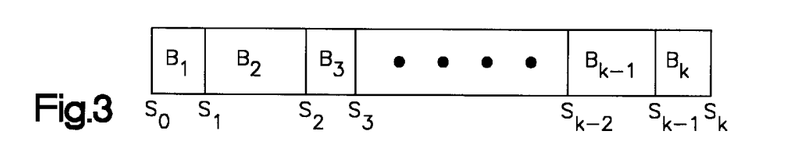
FIG. 3 illustrates a histogram having k bins $B_1, B_2, \ldots, B_k$ defined by bin separators $s_0, s_1, \ldots, s_k$.

With reference to FIG. 3, a k-histogram for a value set V is a partition of D into a predetermined number k of bins $B_1$, $B_2, B_3, \ldots, B_{k-1}, B_k$ defined by a sequence of separators $s_1$, $s_2, \ldots, s_{k-1} \in Z$ such that for all j, $1 \leq j \leq k$, $B_j = \{v_i \in V | s_{j-1} < v_i \leq s_j\}$, where $s_0 = -\infty$ and $S_k = +\infty$ for convenience. The size of each bin $B_j$ is the number of data values in the bin $B_j$ and is denoted by $b_j = |b_j|$. The bins of a histogram are also known as intervals or buckets, for example.

A k-histogram for the value set V is an equi-height histogram if each bin size $b_j$ is exactly n/k. An equi-height k-histogram may not even exist for a set of values V if, for example, the number n of data values in the set of values V is not divisible by the number k of bins. Adaptive random sampling histogram construction tool 300 constructs approximate k-histograms by attempting as much as possible to construct each k-histogram with each bin size $b_j$ of n/k. If the number n of data values in the set of values V is not divisible by the number k of bins, for example, adaptive random sampling histogram construction tool 300 for one embodiment rounds the value of n/k up to the nearest integer and constructs an approximate k-histogram such that the size of the first k−1 bins are each equal to the rounded-up value of n/k while the size of the kth bin is less than n/k.

Although described as constructing equi-height or equi-depth histogram structures, adaptive random sampling histogram construction tool 300 may construct other suitable histogram structures in accordance with the present invention. Adaptive random sampling histogram construction tool 300 may construct, for example, a suitable histogram comprising a predetermined number k of bins $B_1, B_2, B_3, \ldots, B_{k-1}, B_k$ defined by a sequence of separators $s_1, s_2, \ldots, s_{k-1}$ such that the size $b_j$ of each bin $B_j$ is predetermined based on the number of data values used to construct the histogram.

Histogram Accuracy

The error in an approximate equi-height histogram with respect to an exact equi-height histogram may be measured in a variety of suitable manners.

The error in an approximate equi-height histogram with respect to an exact equi-height histogram may be measured as the max error metric Δmax as follows.

$$\Delta max = \max \left|b_j - \frac{n}{k}\right| \text{ for } 1 \leq j \leq k$$

That is, the max error metric Δmax is the maximum difference in the size $b_j$ of each bin $B_j$ of the approximate equi-height histogram from the n/k size of the bin $B_j$ for the exact equi-height histogram.

A k-histogram with Δmax≦δ is defined as a δ-deviant histogram and therefore satisfies the following property.

$$\left|b_j - \frac{n}{k}\right| \leq \delta \text{ for } 1 \leq j \leq k$$

The error in an approximate equi-height histogram with respect to an exact equi-height histogram may also be measured as the maximum fractional deviation $f$ in the size $b_j$ of each bin $B_j$ of the approximate equi-height histogram from the n/k size of the bin $B_j$ for the exact equi-height histogram as follows.

$$f = \max \left|\frac{b_j - n/k}{n/k}\right| \text{ for } 1 \leq j \leq k$$

By requiring that every bin $B_j$ of the approximate equi-height histogram have a size $b_j$ within a predetermined amount of error of the corresponding bin size for the exact equi-height histogram, the approximate equi-height histogram more accurately reflects the exact equi-height histogram locally at all points.

The error in an approximate equi-height histogram with respect to an exact equi-height histogram may be measured as the average error $\Delta_{avg}$ and/or the variance error $\Delta_{var}$ as follows.

$$\Delta_{avg} = \sum_{1 \leq j \leq k} \frac{|b_j - n/k|}{k} \text{ and } \Delta_{var} = \sqrt{\sum_{1 \leq j \leq k} \frac{|b_j - n/k|^2}{k}}$$

These error metrics measure the mean and the variance of the differences in bin sizes between the approximate and exact equi-height histograms.

In contrast to the use of the max error metric Δmax and the maximum fractional deviation $f$, however, the average and variance error metrics measure only a global error over a histogram. Limiting the average and variance errors in a histogram does not guard against the possibility that any one bin has a relatively large error in size. Using the max error metric Δmax and/or the maximum fractional deviation $f$ to limit the amount of error in any one bin helps to tightly bound the error that will occur in query cost estimation, for example.

An even stronger error metric measures the error in the difference of the bin separators for an approximate equi-height histogram with respect to an exact equi-height histogram. Given an approximate equi-height k-histogram H with bins $B_1 \ldots, B_k$ for the value set V and an exact equi-height k-histogram H* with bins $B_1^*, \ldots, B_k^*$ for the value set V, the histograms H and H* are δ-separated if the symmetric difference of the bins $B_j$ and $B_j^*$ is of size at most δ for $1 \leq j \leq k$.

Record-Level Sampling

Using record-level sampling where individual tuples or records are sampled uniformly at random, a random sample R may be obtained from the value set V such that $R \subset V$ and $|R|=r$ by repeatedly obtaining a random value from the value set V, without regard for repeated values, until r data values have been obtained. A k-histogram may be constructed for the random sample R by sorting the r data values in increasing order, dividing the r sorted data values into k bins, and identifying each (r/k)th data value as a separator $s_j$, with $s_0=-\infty$ and $S_k=+\infty$ for convenience. A k-histogram may then be constructed for the value set V by partitioning the n data values of the value set V into k bins $B_1, B_2, \ldots, B_k$ as defined by the sequence of separators $s_0, s_1, \ldots, s_k$ of the histogram constructed from the random sample R.

The number r of data values of the random sample R needed to construct a δ-deviant k-histogram for the value set V with a probability of at least 1−γ, where δ=$f$*n/k, $f \leq 1$, and γ>0, satisfies the following inequality.

$$r \geq \frac{4n^2 \ln(2n/\gamma)}{k\delta^2} = \frac{4k \ln(2n/\gamma)}{f^2}$$

The value of $f$ measures the relative deviation from the optimal bin size n/k and is restricted to $f \leq 1$ as a matter of convenience because the number of data values required for ensuring an error that exceeds 100% in any one bin is unlikely to be of adequate interest. This inequality corresponds to Theorem 4 and Corollary 1 of the conference paper, Surajit Chaudhuri, Rajeev Motwani, Vivek Narasayya, "Random Sampling for Histogram Construction: How Much is Enough?" *Proceedings of ACM SIGMOD*, Seattle, Wash., pp. 436–447 (Jun. 1–4, 1998).

The trade-off between the number k of bins, the deviation threshold $f$, and the number r of random data values may be analyzed by this equation, and the value of each of these parameters may be obtained given suitable values for the other parameters. As seen by the inequality, the number r of needed data values for the sample grows linearly with the number k of bins and inversely with the squared deviation $f$. Because of the logarithmic dependence, the number r of needed data values is only weakly dependent on $\gamma$ and the size n.

The number r of data values of the random sample R needed to construct a $\delta$-separated k-histogram for the value set V with a probability of at least $1-\gamma$, where $\delta = f*n/k$, $f \leq 1$, and $\gamma > 0$, satisfies the following inequality.

$$r \geq \frac{12n^2 \ln(2k/\gamma)}{\delta^2} = \frac{12k^2 \ln(2k/\gamma)}{f^2}$$

This inequality corresponds to Theorem 5 of the conference paper, Surajit Chaudhuri, Rajeev Motwani, Vivek Narasayya, "Random Sampling for Histogram Construction: How Much is Enough?" *Proceedings of ACM SIGMOD*, Seattle, Wash., pp. 436–447 (Jun. 1–4, 1998).

Block-Level Sampling

For disk-resident databases where tuples are stored in disk blocks, however, record-level sampling may prove wasteful as scanning one tuple from a disk block is not much faster than scanning the entire group of tuples stored on the same disk block. Using all or at least a portion of the tuples from the same disk block for the random sample R, however, could bias the approximate histogram constructed using such tuples as there may be correlations between data values in the tuples of the same disk block. If b tuples are stored on each disk block, the minimum number of disk blocks to sample for construction of an approximate histogram with the same error as that constructed by sampling r random tuples for record-level sampling would need to be determined.

If the b tuples in each disk block are totally uncorrelated, only r/b disk blocks would need to be sampled to construct an approximate histogram with the same error as that constructed by sampling r random tuples for record-level sampling.

If the b tuples in each disk block are totally correlated because they have the same value for the attribute of interest, for example, as many as r disk blocks for a total or r*b tuples would need to be sampled to construct an approximate histogram with the same error as that constructed by sampling r random tuples for record-level sampling. Tuples in the same disk block may also be totally correlated because the data values are sorted on the attribute of interest and then assigned to disk blocks in that order.

If, for example, 20% of the disk blocks contained correlated tuples while the remaining 80% contained a random collection of tuples, approximately 1.25*r/b disk blocks would need to be sampled to construct an approximate histogram with the same error as that constructed by sampling r random tuples for record-level sampling.

Because, however, the distribution of data values in disk blocks is not known a priori, the minimum number of disk blocks needed to construct an approximate histogram within a desired or predetermined degree of accuracy may be difficult to determine.

Adaptive Random Sampling Histogram Construction Tool

Adaptive random sampling histogram construction tool 300 constructs a k-histogram using an adaptive random sampling technique with cross-validation to help determine when enough data values of database 210 have been sampled for construction of the k-histogram within a desired or predetermined degree of accuracy regardless of the distribution of data values in database 210.

Adaptive random sampling histogram construction tool 300 constructs an approximate equi-height k-histogram using an initial sample of data values from database 210 and iteratively updates the histogram using an additional sample of data values from database 210 until the histogram is within the desired degree of accuracy. The accuracy of the histogram is cross-validated against the additional sample at each iteration, and the additional sample is used to update the histogram to help improve its accuracy. The accuracy of the histogram may be measured by an error in distribution E of the additional sample over the histogram as compared to a threshold error $E_0$ using any suitable error metric, such as the max error metric $\Delta max$, the maximum fractional deviation $f$, or the symmetric difference in bin separators for example.

Figure 4:
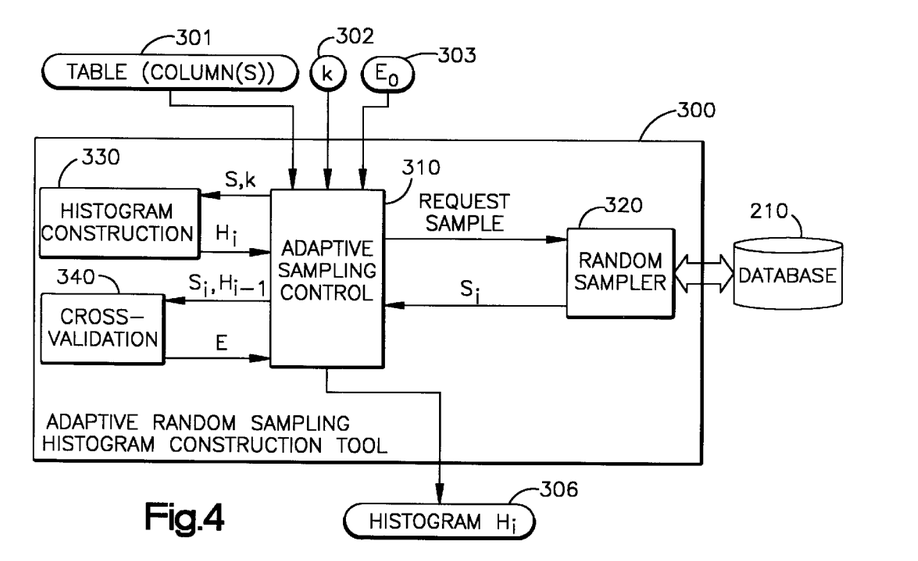
FIG. 4 illustrates, for one embodiment, a tool for constructing histograms using adaptive random sampling with cross-validation for the database system of FIG. 2.

Adaptive random sampling histogram construction tool 300 for one embodiment comprises an adaptive sampling control tool 310, a random sampler 320, a histogram construction tool 330, and a cross-validation tool 340, as illustrated in FIG. 4. Adaptive sampling control tool 310, random sampler 320, histogram construction tool 330, and cross-validation tool 340 for one embodiment are implemented as program modules or computer-executable instructions and may be stored on any suitable computer-readable medium for execution in a suitable operating environment, such as the computing environment of FIG. 1 for example.

Adaptive random sampling histogram construction tool 300 receives as an input an identification 301 of one or more columns of a table of database 210 on which a histogram 306 is to be constructed. Adaptive random sampling histogram construction tool 300 also receives as inputs the number k 302 of bins and the error threshold $E_0$ 303 for construction of the histogram 306.

Adaptive random sampling histogram construction tool 300 for one embodiment receives the identification of columns 301, the number k 302 of bins, and the error threshold $E_0$ 303 from database server 220. The identification of columns 301 may be identified to database server 220, for example, by a suitable update statistics or create index command issued by client tool 230. The number k 302 of bins and the error threshold $E_0$ 303 may be defined by a user of database server 220. The number k 302 of bins and the error threshold $E_0$ 303 may also be identified to database server 220 by client tool 230 and may be defined by a user of client tool 230. For other embodiments, the number k 302 of bins and the error threshold $E_0$ 303 may be globally accessible within database server 220 and therefore available to adaptive random sampling histogram construction tool 300.

Adaptive random sampling histogram construction tool 300 constructs the histogram 306 based on the identification of columns 301, the number k 302 of bins, and the error threshold $E_0$ 303 and outputs the histogram 306 for storage in catalog table 226. The histogram 306 may be implemented in the form of one or more suitable data structures. Adaptive random sampling histogram construction tool 300 for one embodiment constructs the histogram 306 in accordance with a flow diagram 500 of FIG. 5.

Figure 5:
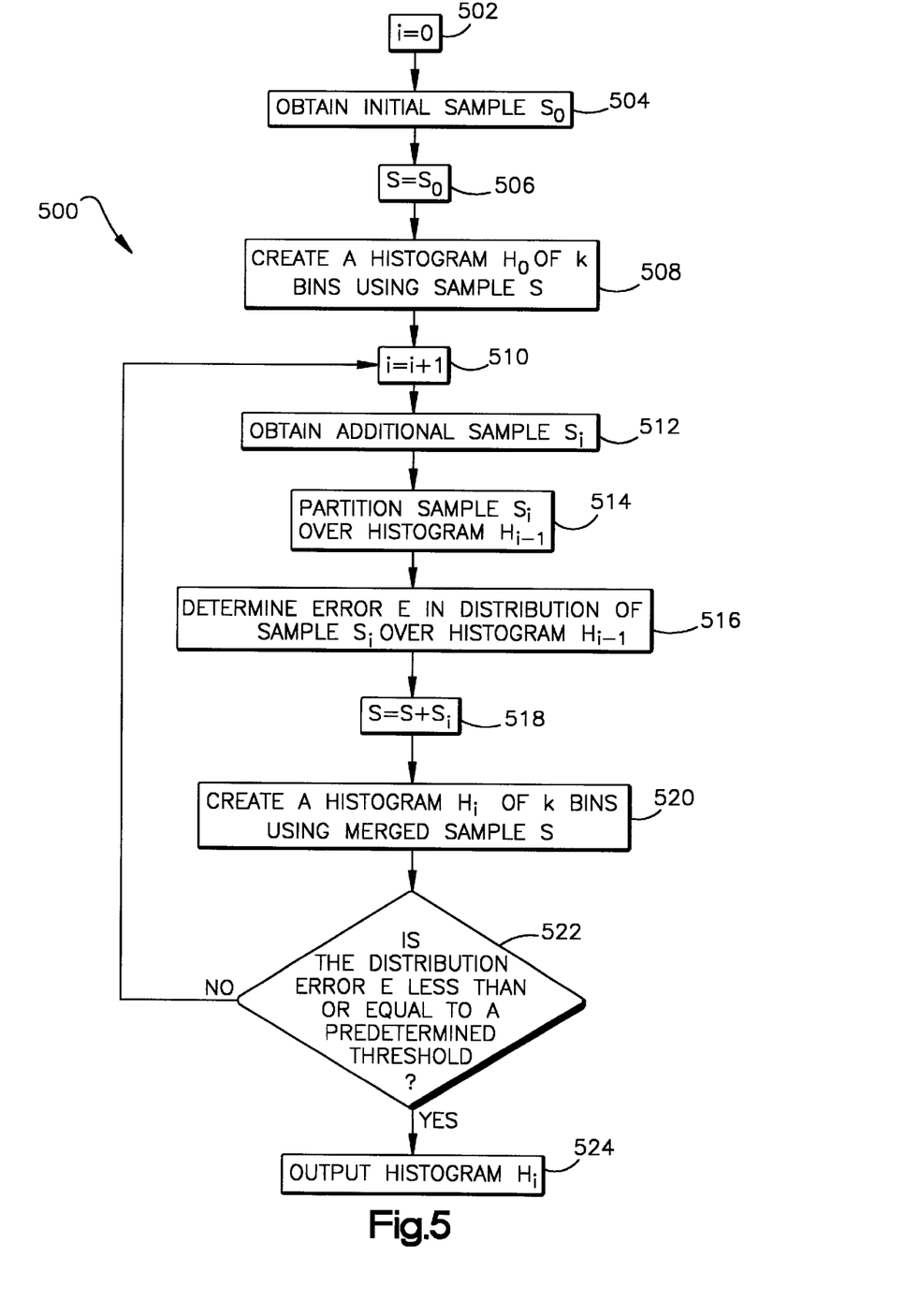
FIG. 5 illustrates, for one embodiment, a flow diagram for constructing a histogram sing adaptive random sampling with cross-validation.

For step 502 of FIG. 5, adaptive sampling control tool 310 initializes a variable i to 0 for use in identifying samples obtained from database 210 and histograms constructed based on such samples.

For step 504, adaptive sampling control tool 310 obtains an initial sample $S_0$ of data values from database 210. As illustrated in FIG. 4, adaptive sampling control tool 310 requests random sampler 320 to obtain from database 210 a random sample of data values on the column(s) identified by column identification 301. Random sampler 320 obtains from database 210 a random sample of a predetermined number $t_0$ of data values on the identified column(s) and returns the obtained sample $S_0$ to adaptive sampling control tool 310.

The number $t_0$ of data values for the initial sample $S_0$ may be computed as the number r of random data values needed to construct a δ-deviant k-histogram or, alternatively, a δ-separated k-histogram on the identified column(s) 301 using record-level sampling. The number $t_0$ of data values may therefore be computed based on the total number n of data tuples comprising data values in the identified column (s) 301 in database 210, the number k 302 of bins, the value of $f$ or δ as determined from the error threshold $E_0$ 303, and a suitable value for γ.

For one embodiment, the number $t_0$ of data values of the initial sample $S_0$ is computed as the minimum value of either $4n^2/k\delta^2 = 4k/f^2$ or $\sqrt{n}$. Although this initial number $t_0$ of data values underestimates the number r of random data values needed to construct a δ-deviant k-histogram, the algorithm of FIG. 5 adaptively samples data values until the histogram 306 has been constructed within the desired degree of accuracy and therefore allows an initial sampling of fewer data values. Sampling an initial number $t_0 = 4n^2/k\delta^2 = 4k/f^2$ of data values helps in constructing histograms for relatively large relations while sampling an initial number $t_0 = \sqrt{n}$ of data values helps in constructing histograms for relatively small relations.

Once the number $t_0$ of data values has been determined, the number $g_0$ of disk blocks to be scanned for the initial sample $S_0$ may be determined as $g_0 = t_0/b$, where b is the number of records or tuples stored on each disk block of database 210. Adaptive sampling control tool 310 for one embodiment may determine and specify the number $g_0$ of disk blocks for the sample $S_0$ in requesting the sample $S_0$ from random sampler 320.

For step 506, adaptive sampling control tool 310 initializes a merged sample S to $S_0$ for use in accumulating samples obtained from database 210. The merged sample S comprises a total number t of data values at any one time.

As For step 508, adaptive sampling control tool 310 constructs a histogram $H_0$ comprising k bins using the merged sample S. Adaptive sampling control tool 310 identifies the number k of bins and the merged sample S to histogram construction tool 330, and histogram construction tool 330 constructs the histogram $H_0$ and returns the histogram $H_0$ to adaptive sampling control tool 310, as illustrated in FIG. 4.

Histogram construction tool 330 constructs the histogram $H_0$ by sorting the number t of data values in the sample S in increasing order, dividing the t sorted data values into k bins, and identifying each (t/k)th data value as a separator $s_j$, with $s_0 = -\infty$ and $S_k = +\infty$ for convenience. If the value of t/k is a non-integer, histogram construction tool 330 for one embodiment rounds the value of t/k up to the nearest integer for purposes of determining the sequence of separators $s_1, s_2, \ldots, S_{k-1}$ so that the size of the first k−1 bins are each equal to the rounded-up value of t/k while the size of the kth bin is less than t/k.

For step 510, adaptive sampling control tool 310 increments the variable i by 1 to identify another sample to be obtained from database 210 and a histogram constructed based on this other sample.

For step 512, adaptive sampling control tool 310 obtains an additional sample $S_i$ of $t_i$ data values from database 210. Adaptive sampling control tool 310 obtains the sample $S_i$ using random sampler 320 similarly as for step 504. Random sampler 320 may obtain an additional sample $S_i$ from database 210 either with or without replacement. For one embodiment, the number $t_i$ of data values is determined as $t_i = 2^{i-1} * t_0$, and therefore the number $g_i$ of disk blocks is determined as $g_i = 2^{i-1} * g_0$.

Adaptive sampling control tool 310 for step 514 partitions the sample $S_i$ over the histogram $H_{i-1}$ and for step 516 determines the error E in distribution of the $t_i$ data values of the sample $S_i$ over the histogram $H_{i-1}$. Adaptive sampling control tool 310 identifies the sample $S_i$ and the histogram $H_{i-1}$ to cross-validation tool 340, and cross-validation tool 340 determines the distribution error E and returns the distribution error E to adaptive sampling control tool 310, as illustrated in FIG. 4.

Cross-validation tool 340 for one embodiment partitions the sample $S_i$ over the histogram $H_{i-1}$ by partitioning the $t_i$ data values of the sample $S_i$ into k bins $B_{i1}, B_{i2}, \ldots, B_{ik}$ as defined by the sequence of separators $s_1, s_2, \ldots, s_{k-1}$ of the histogram $H_{i-1}$. Cross-validation tool 340 then determines the distribution error E by determining for each bin $B_{ij}$ the difference in the number of data values of the sample $S_i$ in the bin $B_{ij}$ as the result of partitioning over the histogram $H_{i-1}$ from the number of data values of the sample $S_i$ that would be in the bin $B_{ij}$ if the sample $S_i$ was partitioned into an equi-height histogram. That is, cross-validation tool 340 determines for each bin $B_{ij}$ the difference in the size $b_{ij}$ of the bin $B_{ij}$ from $t_i/k$. If the value of $t_i/k$ is a non-integer, cross-validation tool 340 for one embodiment rounds the value of $t_i/k$ up to the nearest integer for the first k−1 bins and determines the number of data values of the sample $S_i$ that would be in the kth bin if the sample $S_i$ was partitioned into an equi-height histogram as the number of remaining data values.

The distribution error E for one embodiment is the max error metric Δmax as follows.

$$\Delta\max = \max\left|b_{ij} - \frac{t_i}{k}\right| \text{ for } 1 \le j \le k$$

The distribution error E may also be the maximum fractional deviation $f$ between the number of data values of the sample $S_i$ in each bin $B_{ij}$ as the result of partitioning over the histogram $H_{i-1}$ as compared to the number of data values of the sample $S_i$ that would be in the bin $B_{ij}$ if the sample $S_i$ was partitioned into an equi-height histogram as follows.

$$f = \max\left|\frac{b_{ij} - t_i/k}{t_i/k}\right| \text{ for } 1 \le j \le k$$

For another embodiment, only a subset of one or more tuples from each of the $g_i$ disk blocks is used for cross-validation of the histogram $H_{i-1}$ against the new sample $S_i$.

Adaptive sampling control tool 310 for step 518 merges the sample $S_i$ into the merged sample S and for step 520 constructs a new histogram $H_i$ comprising k bins using the merged sample S. By constructing the histogram $H_i$ based on the samples of data values obtained thus far for steps 504 and 512, adaptive sampling control tool 310 effectively updates the histogram $H_{i-1}$. Adaptive sampling control tool 310 constructs the histogram $H_i$ using histogram construction tool 330 similarly as for step 508.

For step 522, adaptive sampling control tool 310 determines whether the distribution error E is less than or equal to the error threshold $E_0$ 303. If so, adaptive sampling control tool 310 determines the histogram $H_{i-1}$ is within the desired degree of accuracy and for step 524 outputs the histogram $H_i$ 306. Adaptive sampling control tool 310 otherwise repeats steps 510–522 to determine whether the updated histogram $H_i$ is within the desired degree of accuracy as measured against an additional sample of data values and to update the histogram $H_i$ based on the additional sample until the updated histogram $H_i$ is within the desired degree of accuracy as determined for step 522.

Adaptive sampling control tool 310 for another embodiment may update the histogram $H_{i-1}$ for step 520 only if the histogram $H_{i-1}$ is not within the desired degree of accuracy as determined for step 522 and may therefore output histogram $H_{i-1}$ for step 524. That is, adaptive sampling control tool 310 may perform step 520 during each iteration between steps 522 and 510. The benefit realized from outputting the likely more accurate histogram $H_i$ for step 524, however, may weigh in favor of incurring the additional cost in time to update the histogram $H_{i-1}$ with the already obtained additional sample $S_i$.

Although the error threshold $E_0$ 303 may be exceeded in cross-validating the histogram $H_{i-1}$ against the new sample $S_i$ for a given iteration, updating the histogram $H_{i-1}$ with that same sample $S_i$ helps accelerate the rate of convergence. For embodiments where the error distribution E is based on an error amount in each bin of the histogram $H_{i-1}$, for example, the bins of the histogram $H_{i-1}$ with the larger errors as revealed by the sample $S_i$ will likely be most affected in updating the histogram $H_{i-1}$ with that same sample $S_i$.

Rather than making any a priori assumptions about data distribution to decide when convergence can be assumed, adaptive random sampling histogram construction tool 300 actively tests for convergence. In effect, adaptive random sampling histogram construction tool 300 uses the data distribution itself through random sampling to test for convergence on that very data distribution without explicitly modeling the data distribution.

For one embodiment where $g_0=t_0/b$ for step 504 and $g_i=2^{i-1}*g_0$ for i>0 for step 512, the number $g_i$ of disk blocks in each new sample is equal to the sum of the number of disk blocks obtained for all prior samples. The size of the merged sample S is therefore doubled on each iteration.

The number $g_i$ of disk blocks for step 512 may be determined in other suitable manners. The number $g_i$ of disk blocks for step 512 may be determined, for example, as any suitable function of the total number n of data tuples comprising data values in the identified column(s) 301 in database 210 and/or the variable i. The number $g_i$ of disk blocks for step 512 may also be determined for each iteration, for example, based on the amount of the distribution error E relative to the total number of samples previously obtained. A larger number $g_i$ of disk blocks, for example, may be sampled for step 512 to help accelerate convergence when the distribution error E is large relative to the total number of samples previously obtained.

Duplicate Values

When the value set V contains repeated or duplicate values, the value of adjacent separators $s_{j-1}$ and $s_j$ of a histogram may be the same because all data values in the bin $B_j$ defined by the separators $s_{j-1}$ and $s_j$ have the same value v. The preceding bin $B_{j-1}$ and/or the succeeding bin $B_{j+1}$ may also comprise one or more data values v. A histogram with separators having the same value may not be cross-validated against a sample of data values because that same data value may be assigned to more than one bin. The error in an approximate equi-height histogram with respect to an exact equi-height histogram for one embodiment may therefore be determined by determining a plurality of distinct ranges of data values for the histogram as defined by a sequence of distinct data value boundaries.

The max error metric $\Delta$max and the maximum fractional deviation $f$, for example, may be generalized to account for duplicate values in the data set in this manner. Given the sequence of separators $s_1, \ldots, s_{k-1}$ for an approximate histogram constructed from a random sample R of the value set V, the sequence of distinct values in this sequence define a plurality of distinct ranges for the histogram and may be denoted by $d_1, \ldots, d_m$ where m<k. The fraction of the r data values of the random sample R that are less than or equal to $d_j$ may be denoted by $f_j$ for $1 \leq j \leq m$, with $f_0=0$ and $f_{m+1}=1$, and the fraction of the n data values of the value set V that are less than or equal to $d_j$ may be denoted by $p_j$ for $1 \leq j \leq m$, with $p_0=0$ and $p_{m+1}=1$. The error in an approximate equi-height histogram with respect to an exact equi-height histogram may then be measured as the fractional max error $f'$ as follows.

$$f' = \max\left|\frac{(f_{j+1} - f_j) - (p_{j+1} - p_j)}{f_{j+1} - f_j}\right| \text{ for } 0 \leq j \leq m$$

This definition strictly generalizes the maximum fractional deviation $f$ and may be used to overcome the problem encountered in cross-validating a histogram with separators having the same value.

For adaptive random sampling with cross-validation, adaptive sampling control tool 310 for step 516 of FIG. 5 determines the sequence of distinct values $d_1, \ldots, d_m$ in the sequence of separators $s_1, \ldots, s_{k-1}$ of the histogram $H_{i-1}$, the fraction $f_j$ of the t data values of the merged sample S that are less than or equal to each distinct value $d_j$, the fraction $p_j$ of the $t_i$ data values of the new sample $S_i$ that are less than or equal to each distinct value $d_j$, and the distribution error E as the fractional max error $f'$ based on these determined fractions.

When the separators $s_1, \ldots, s_{k-1}$ of the histogram $H_{i-1}$ are not distinct, the factor $f_{j+1}-f_j$ measures the fraction of the t data values in the (j+1)th distinct range of the merged sample S, and the factor $p_{j+1}-p_j$ measures the corresponding fraction in the new sample $S_i$. The denominator $f_{j+1}-f_j$ scales the error by the fraction of the t data values in the (j+1)th distinct range of the merge sample S. When all of the separators $s_1, \ldots, s_{k-1}$ of the histogram $H_{i-1}$ are distinct, the factor $f_{j+1}-f_j$ reduces to approximately 1/k, the factor $p_{j+1}-p_j$ reduces to $b_{ij}/t_i$, and the fractional max error $f'$ reduces to the maximum fractional deviation $f$.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. In a database system comprising a database, a method for constructing a histogram comprising the steps of:
   (a) creating a histogram using an initial sample of data values from the database;
   (b) obtaining an additional sample of data values from the database;
   (c) determining a degree of accuracy of the histogram based on a comparison of the additional sample with the histogram; and
   (d) updating the histogram using the additional sample of data values from the database until the histogram is within a predetermined degree of accuracy.

2. The method of claim 1, wherein the creating step (a) and the updating step (d) each comprise the step of defining the histogram such that the histogram comprises a predetermined number of bins for storing data values.

3. The method of claim 2, wherein the creating step (a) and the updating step (d) each comprise the step of designating a predetermined number of data values for storage in each bin.

4. The method of claim 3, wherein the predetermined number of data values designated for all but one of the predetermined number of bins is the same.

5. The method of claim 1, wherein the updating step (d) comprises the steps of:
(i) determining an error amount for each of a plurality of bins of the histogram, and
(ii) determining the histogram is within the predetermined degree of accuracy if the error amount for each bin is less than or equal to a predetermined threshold.

6. The method of claim 1, wherein the determining step (c) comprises the steps of:
(i) partitioning the additional sample of data values over the histogram,
(ii) determining an error in distribution of the additional sample of data values over the histogram,
(iii) updating the histogram using the additional sample of data values, and
(iv) repeating steps (i), (ii), and (iii) until the error in distribution of the additional sample of data values over the histogram is less than or equal to a predetermined threshold indicating the histogram is within the predetermined degree of accuracy.

7. The method of claim 6, wherein the partitioning step (c)(i) comprises the step of partitioning the data values of the additional sample into a plurality of bins in accordance with the histogram; and
wherein the determining step (c)(ii) comprises the steps of determining for each bin the difference in the number of data values of the additional sample in the bin from a predetermined number of data values designated for the bin and determining the error in distribution based on the determined differences.

8. The method of claim 7, wherein the determining step (c)(ii) comprises the step of determining the error in distribution as the maximum of the determined differences.

9. The method of claim 7, wherein the determining step (c)(ii) comprises the step of determining the error in distribution as the maximum fractional difference between the number of data values of the additional sample in any bin as compared to the predetermined number of data values designated for that bin.

10. The method of claim 7, wherein the predetermined number of data values designated for each bin is approximately equal to the total number of data values of the additional sample divided by the number of bins.

11. The method of claim 1, wherein the creating step (a) comprises the step of obtaining as the initial sample a random sample of data values from one relation of data of the database approximately linearly proportional in number to the square root of the total number of data tuples from the one relation of data of the database.

12. The method of claim 1, wherein the creating step (a) comprises the steps of defining the histogram with a plurality of bins for storing data values and obtaining as the initial sample a random sample of data values approximately linearly proportional in number to the number of bins.

13. The method of claim 9, wherein the creating step (a) comprises the step of obtaining as the initial sample a random sample of data values approximately inversely proportional in number to the square of the predetermined threshold.

14. The method of claim 1, wherein the updating step (b) comprises the step of obtaining as the $i^{th}$ additional sample a random sample of data values approximately $2^{i-1}$ time(s) the number of data values in the initial sample.

15. The method of claim 1, comprising the step of obtaining the initial sample of data values and each additional sample of data values in units of disk blocks each having a predetermined number of data values.

16. The method of claim 6, wherein the partitioning step (c)(i) comprises the steps of determining a plurality of distinct ranges defined by a sequence of distinct data value separators of the histogram and partitioning the data values of the additional sample into the plurality of distinct ranges; and
wherein the determining step (c)(ii) comprises the step of determining the error in distribution based on the partitioning of the data values of the additional sample into the plurality of distinct ranges.

17. The method of claim 16, wherein the determining step (c)(ii) comprises the step of determining the error in distribution as the maximum fractional difference between the fraction of data values of the additional sample in any distinct range as compared to the fraction of data values of all prior samples in that distinct range.

18. The method of claim 1, comprising the step of:
(e) using the updated histogram to obtain a query optimization estimate.

19. A computer readable medium having computer-executable instructions for performing steps comprising:
(a) creating a histogram using an initial sample of data values from the database;
(b) obtaining an additional sample of data values from the database; and
(c) determining a degree of accuracy of the histogram based on a comparison of the additional sample with the histogram; and
(d) updating the histogram using the additional sample of data values from the database until the histogram is within a predetermined degree of accuracy.

20. The computer readable medium of claim 19, wherein the updating step (d) comprises the steps of:
(i) determining an error amount for each of a plurality of bins of the histogram, and
(ii) determining the histogram is within the predetermined degree of accuracy if the error amount for each bin is less than or equal to a predetermined threshold.

21. The computer readable medium of claim 19, wherein the updating step (d) comprises the steps of:
(i) partitioning the additional sample of data values over the histogram,
(ii) determining an error in distribution of the additional sample of data values over the histogram,
(iii) updating the histogram using the additional sample of data values, and
(iv) repeating steps (i), (ii), and (iii) until the error in distribution of the additional sample of data values over the histogram is less than or equal to a predetermined threshold indicating the histogram is within the predetermined degree of accuracy.

22. The computer readable medium of claim 19 having computer-executable instructions for performing the step of obtaining the initial said of data values and each additional sample of data values in units of disk blocks each having a predetermined number of data values.

23. The computer readable medium of claim 21, wherein the partitioning step (d)(i) comprises the steps of determining a plurality of distinct ranges defined by a sequence of distinct data value separators of the histogram and partitioning the data values of the additional sample into the plurality of distinct ranges; and wherein the determining step (d)(ii) comprises the step of determining the error in distribution based on the partitioning of the data values of the additional sample into the plurality of distinct ranges.

24. The computer readable medium of claim 19 having further computer-executable instructions for performing the step of:

(c) using the updated histogram to obtain a query optimization estimate.

25. In a database system comprising a database, a method for constructing a histogram comprising the steps of:

(a) creating a histogram comprising a predetermined number of bins each storing a predetermined number of data values of an initial sample of data values from the database;

(b) partitioning an additional sample of data values from the database over the histogram;

(c) determining an error in distribution of the additional sample of data values over the histogram;

(d) updating the histogram using the additional sample of data values; and (e) repeating steps (b), (c), and (d) until the error in distribution of the additional sample of data values over the histogram is less than or equal to a predetermined threshold.

26. The method of claim 25, wherein the predetermined number of data values designated for all but one of the predetermined number of bins is the same.

27. The method of claim 25, wherein the partitioning step (b) comprises the step of partitioning the data values of the additional sample into the bins of the histogram; and wherein the determining step (c) comprises the steps of:

(i) determining for each bin the difference in the number of data values of the additional sample in the bin from a predetermined number of data values of the additional sample designated for the bin, and (ii) determining the error in distribution based on the determined differences.

28. The method of claim 27, wherein the determining step (c)(ii) comprises the step of determining the error in distribution as the maximum of the determined differences.

29. The method of claim 27, wherein the determining step (c)(ii) comprises the step of determining the error in distribution as the maximum fractional difference between the number of data values of the additional sample in any bin as compared to the predetermined number of data values of the additional sample designated for that bin.

30. The method of claim 27, wherein the predetermined number of data values of the additional sample designated for each bin is approximately equal to the total number of data values of the additional sample divided by the number of bins.

31. The method of claim 25, wherein the creating step (a) comprises the step of obtaining as the initial sample a random sample of data values from one relation of data of the database approximately linearly proportional in number to the square root of the total number of data tuples from the one relation of data of the database.

32. The method of claim 25, wherein the creating step (a) comprises the step of obtaining as the initial sample a random sample of data values approximately linearly proportional in number to the predetermined number of bins.

33. The method of claim 29, wherein the creating step (a) comprises the step of obtaining as the initial sample a random sample of data values approximately inversely proportional in number to the square of the predetermined threshold.

34. The method of claim 25, wherein the partitioning step (b) comprises the step of obtaining as the ith additional sample a random sample of data values approximately $2_{i-1}$ time(s) the number of data values in the initial sample.

35. The method of claim 25, comprising the step of obtaining the initial sample of data values and each additional sample of data values in units of disk blocks each having a predetermined number of data values.

36. The method of claim 25, wherein the partitioning step (b) comprises the steps of determining a plurality of distinct ranges defined by a sequence of distinct data value separators of the histogram and partitioning the data values of the additional sample into the plurality of distinct ranges; and wherein the determining step (c) comprises the step of determining the error in distribution based on the partitioning of the data values of the additional sample into the plurality of distinct ranges.

37. The method of claim 36, wherein the determining step (c) comprises the step of determining the error in distribution as the maximum fractional difference between the fraction of data values of the additional sample in any distinct range as compared to the fraction of data values of all prior samples in that distinct range.

38. The method of claim 25, comprising the step of:

(f) using the updated histogram to obtain a query optimization estimate.

39. A computer readable medium having computer-executable instructions for performing steps comprising:

(a) creating a histogram comprising a predetermined number of bins each storing a predetermined number of data values of an initial sample of data values from a database;

(b) partitioning an additional sample of data values from the database over the histogram;

(c) determining an error in distribution of the additional sample of data values over the histogram;

(d) updating the histogram using the additional sample of data values; and (e) repeating steps (b), (c), and (d) until the error in distribution of the additional sample of data values over the histogram is less than or equal to a predetermined threshold.

40. The computer readable medium of claim 39 having computer-executable instructions for performing the step of obtaining the initial sample of data values and each additional sample of data values in units of disk blocks each having a predetermined number of data values.

41. The computer readable medium of claim 39, wherein the partitioning step (b) comprises the steps of determining a plurality of distinct ranges defined by a sequence of distinct data value separators of the histogram and partitioning the data values of the additional sample into the plurality of distinct ranges; and wherein the determining step (c) comprises the step of determining the error in distribution based on the partitioning of the data values of the additional sample into the plurality of distinct ranges.

42. The computer readable medium of claim 39 having further computer-executable instructions for performing the step of:

(f) using the updated histogram to obtain a query optimization estimate.

* * * * *